Nov. 30, 1937. T. P. WEINHART 2,100,929

DOLLY FOR WASHING MACHINES AND THE LIKE

Filed Jan. 28, 1937

INVENTOR.
T. P. WEINHART
BY M. Talbert Dick
ATTORNEY.

Patented Nov. 30, 1937

2,100,929

UNITED STATES PATENT OFFICE 2,100,929

DOLLY FOR WASHING MACHINES AND THE LIKE

Theodore P. Weinhart, Ankeny, Iowa, assignor of seventy-five percent to Glenn E. Kellogg, Des Moines, Iowa Application January 28, 1937, Serial No. 122,809

6 Claims. (Cl. 259—99)

The principal object of this invention is to provide a washing machine dolly that may be efficiently used with power shafts terminating below the water line within a washing machine.

A further object of this invention is to provide a dolly for washing machines that provides an air seal adjacent the bearing in the bottom of the tub, to aid in the prevention of leaks about the packing gland of a shaft extending through the bottom of the tub.

A still further object of my invention is to provide a dolly for washing machines and the like that may be easily removed for cleaning and the like.

A still further object of this invention is to provide a dolly for washing machines and the like that is simple in construction, compact, and capable of causing a great amount of turbulence of the water within a washing machine.

Still further objects of my invention are to provide a dolly for washing machines and the like that is economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Dollies for washing machines now in use are of two general types. One of these operates from a shaft extending downwardly through the top of the washing machine and is only suitable for hand power washers. The other type of dolly is for use on a shaft that extends above the water line and the dolly hangs on this shaft so that although it is operated from above the surface of the water, the dolly extends to a point adjacent the bottom for agitating the water in the tub. Heretofore it has been necessary that the dolly be in this particular shape because the shaft housing necessarily had to extend above the water line to prevent leaks about the drive shaft. Recently, however, shafts driving directly through the bottom of the tub have been developed, eliminating any moving parts above the water line in a tub, thereby minimizing the danger connected with a washing machine as well as allowing for the efficient turbulation of the water from the bottom of the tub, but as yet no efficient type of dolly has been devised for use with this particular type of shaft. I have overcome these disadvantages and objections of previous types of dollies and provided one especially adaptable for use with the above designated shaft and of more efficient design as will be appreciated and as hereinafter more fully set forth.

Figure 1:
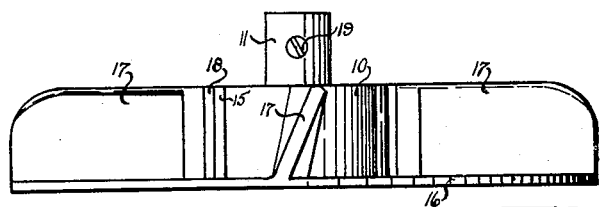
Fig. 1 is a side plan view of my complete device and its coupling unit.
Figure 2:
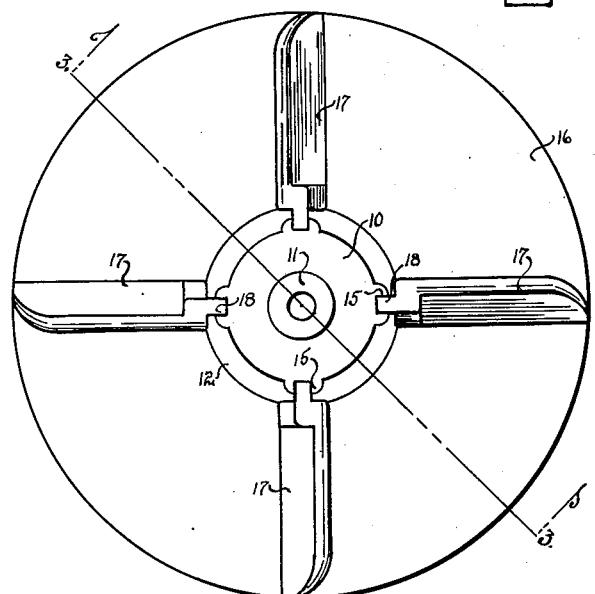
Fig. 2 is a top plan view of my complete device with the dolly in place on the base unit.
Figure 3:
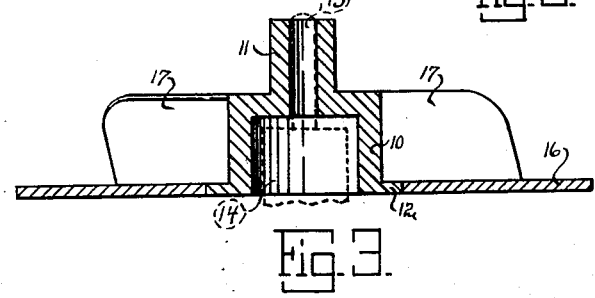
Fig. 3 is a side sectional view of my device and is taken on the line 3—3 of Fig. 2.
Figure 4:
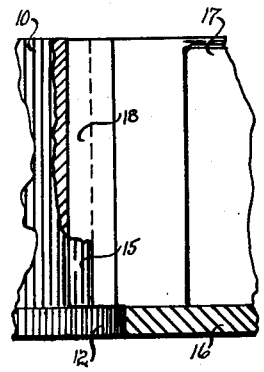
Fig. 4 is an enlarged partial sectional view of my dolly and base unit showing the method of operatively securing the dolly to the base unit.
Figure 5:
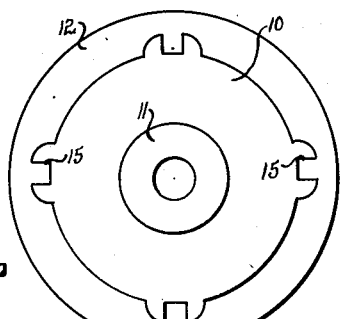
Fig. 5 is an enlarged top plan view of the base unit of my device.

Referring to the drawing, I have used the numeral 10 to designate the base or inverted cup portion of my device having the shaft bearing 11 integrally formed on its upper end portion and an outwardly extending flange 12 about its lower peripheral edge. The bearing member 11 is designed to receive a shaft 13 of an ordinary driving mechanism as shown by dotted lines in Fig. 3 and the opening or chamber in the cup portion 10 is designed to enclose the packing gland or shaft housing 14 of an ordinary drive mechanism which is also illustrated by dotted lines in Fig. 3. I have used the numeral 15 to designate a plurality of flanges or vertical ridges formed on the outer surface of the inverted cup member 10 extending parallel with the longitudinal center of the cup member 10 and shaft bearing 11. These flange ridges 15 have longitudinal slots cut therein and extending from a position even with the top portion of the inverted cup member 10 down to the upper surface of the flange 12.

The numeral 16 designates a flat circular ring designed to have its open central portion fit adjacent the rim 12 of the inverted cup member 10 and in the same plane as the rim 12. Integrally formed on the ring or plate 16 are a plurality of paddles or agitating fins 17 which extend upwardly and at an angle to the surface of the ring 16 as shown in the drawing. The numeral 18 designates a lug on the inner end of each of the paddles 17 which extends inwardly beyond the open portion of the ring 16 and which are designed to engage the slots in the flanges 15 when the ring 16 with its attendant paddles 17 is placed in position upon the inverted cup member 10. The numeral 19 designates a set screw or the like threaded into the shaft bearing 11 for contacting the shaft 13 for operating the complete dolly assembly.

The practical operation of my device is as follows: The bearing member 11 is placed on the usual drive shaft 13 fitting tightly on this shaft. The set screw 19 is tightened so that the dolly mechanism may be positively driven without danger of slipping. The ring 16 with its integrally formed paddle members 17 are then placed on the inverted cup member 10 so that the lugs 18 engage the slots in the flange ridges 15 and the lower portion of the shoulder of the paddles rests against the rim 12 of the inverted cup member 10. The bearing housing 14 of the shaft 13 fits up inside of the inverted cup member so that when the tub is filled with water, an air lock will form in the upper portion of the inverted cup member 10, further preventing any possibility of leakage around the shaft 13. If the mechanism is tight, the water can only raise within the cup member to such a point that the air pressure caused by the water rising within the cup member prevents the water from rising any further, thus keeping water away from the shaft bearing. When the mechanism is driven, it is driven one way and then the action is reversed, as is common in washing machines to cause a great amount of turbulence and agitation in the water. Thus in one direction of revolution, the water is thrown upwardly and outwardly, due to the pitch of the paddle members or blades 17, and when counter-rotated, tends to push the water and to further disturb and agitate the water in the tub. Thus it will be seen that I have provided a dolly for washing machines and the like that provides a positive air lock about the shaft for the prevention of leakage from the machine, that is easily removed and cleaned, that is compact, simple, and which presents no projecting moving parts above the water line of the ordinary washing machine. Furthermore, my device does not impose as much strain on the driving mechanism as dollies formerly in use, inasmuch as the shaft need not be as long and does not have the tendency to spring or whip as is the case in dollies that are secured to the driving mechanism above the water line and extends down below the water line.

Some changes may be made in the construction and arrangement of my improved dolly for washing machines and the like without departing from the real spirit and purpose of my invention, and it is my intention to cover by my claims any modified forms of structure or use of mechanical equivalents which may be reasonably included within their scope.

I claim:

1. In a device of the class described, an inverted cup member, vertical ridges on the outside of said inverted cup member, a shaft bearing in the upper side of said inverted cup member at its center, an outwardly extending flange about the lower outer marginal edge of said inverted cup member, a flat ring, agitating fins on said ring, and lugs on the inner end of said fins capable of being received by said vertical ridges on said inverted cup member.

2. In a device of the class described, an inverted cup member, vertical ridges on the outside of said cup member, a shaft bearing in the upper side of said inverted cup member at its center, an outwardly extending flange about the lower outer marginal edge of said inverted cup member, a flat ring, agitating fins on said ring, lugs on the inner end of said fins capable of being received by said vertical ridges on said inverted cup member, and a means for securing said shaft bearing to a shaft element.

3. In a device of the class described, an inverted cup member, a shaft bearing extending upwardly from the central portion of said inverted cup member, a flange formed about the lower peripheral edge of said inverted cup member, vertical slots formed at spaced intervals about the peripheral side of said inverted cup member, a ring portion designed to fit adjacent to and in the same plane with said flange on said inverted cup member, agitating fins integrally formed on said ring and extending upwardly at an angle to said ring, and lugs integrally formed on the inner end of each of said fins capable of being engaged by said vertical slots when said ring and said fins are placed in position on said inverted cup member.

4. In a device of the class described, an inverted cup member, a shaft bearing extending upwardly from the central portion of said inverted cup member, a flange formed about the lower peripheral edge of said inverted cup member, vertical slots formed at spaced intervals about the peripheral side of said inverted cup member, a ring portion designed to fit adjacent to and in the same plane with said flange on said inverted cup member, agitating fins integrally formed on said ring and extending upwardly at an angle to said ring, lugs integrally formed on the inner end of each of said fins capable of being engaged by said vertical slots when said ring and said fins are placed in position on said inverted cup member, and a means for securing said shaft bearing to a shaft.

5. In a device of the class described, an inverted cup member, a bearing portion in the center of said inverted cup member, a plurality of vertical slots in the outer side of said inverted cup member, a ring portion surrounding said inverted cup member, agitating fins formed on said ring and extending upwardly at an angle to said ring, and a lug formed on the inner end of each of said fins entering and engaging one of said slots in said inverted cup member.

6. In a device of the class described, an inverted cup member, a bearing portion centrally located on said cup, a flange formed about the periphery of said cup member, a ring portion designed to fit adjacent to and in the same plane of said flange on said cup member, agitating fins integrally formed on said ring and extending upwardly at an angle to said ring, and a means for securing the inner ends of each of said fins to said inverted cup member.

THEODORE P. WEINHART.